(12) United States Patent
Keene et al.

(10) Patent No.: US 7,740,248 B2
(45) Date of Patent: Jun. 22, 2010

(54) ANNULAR SEAL

(75) Inventors: Kendall E. Keene, Houston, TX (US); John C. Vicic, Spring, TX (US)

(73) Assignee: Cameron International Corporation, Houston, TX (US)

( * ) Notice: Subject to any disclaimer, the term of this patent is extended or adjusted under 35 U.S.C. 154(b) by 820 days.

(21) Appl. No.: 10/664,747

(22) Filed: Sep. 18, 2003

(65) Prior Publication Data

US 2005/0062235 A1    Mar. 24, 2005

(51) Int. Cl.
| | |
|---|---|
| F16L 17/00 | (2006.01) |
| F16L 17/06 | (2006.01) |
| F16L 19/00 | (2006.01) |
| F16J 15/02 | (2006.01) |

(52) U.S. Cl. .................. 277/603; 277/609; 277/611; 277/619; 277/638; 277/644; 285/351; 285/123.12

(58) Field of Classification Search .............. 277/338, 277/323–324, 603, 606–609, 611, 615–616, 277/619, 626–628, 638–639, 641, 644, 650; 285/123.12, 351
See application file for complete search history.

(56) References Cited

U.S. PATENT DOCUMENTS

| | | | | |
|---|---|---|---|---|
| 1,350,553 | A | | 8/1920 | Mack |
| 2,829,909 | A | * | 4/1958 | Magnani .................. 285/345 |
| 2,988,148 | A | | 6/1961 | Conrad et al |
| 3,229,767 | A | | 1/1966 | Carter |
| 3,554,280 | A | | 1/1971 | Tucker |
| 3,836,159 | A | * | 9/1974 | Dryer ........................ 277/612 |
| 3,869,132 | A | * | 3/1975 | Taylor et al. ............... 277/608 |
| 3,924,907 | A | * | 12/1975 | Czernik et al. .............. 384/36 |
| 4,106,779 | A | * | 8/1978 | Zabcik ........................ 277/322 |
| 4,188,998 | A | | 2/1980 | Upton |
| 4,326,588 | A | | 4/1982 | McStravick |
| 4,381,114 | A | * | 4/1983 | Vanderford, Jr. ............ 277/322 |
| 4,429,854 | A | | 2/1984 | Kar et al. |
| 4,496,162 | A | * | 1/1985 | McEver et al. .............. 277/336 |
| 4,501,430 | A | | 2/1985 | Kuhl et al. |
| 4,553,759 | A | * | 11/1985 | Kilmoyer .................... 251/214 |
| 4,715,624 | A | * | 12/1987 | Frye ............................ 285/55 |

(Continued)

FOREIGN PATENT DOCUMENTS

EP     0579379     1/1994

(Continued)

*Primary Examiner*—Vishal Patel
(74) *Attorney, Agent, or Firm*—Fletcher Yoder

(57) ABSTRACT

A seal assembly capable of low temperature service is disclosed. It features upper and lower metallic backup rings that are specially shaped to act as a spring to keep the sidewalls of such rings in contact with the inside and outside surfaces to be sealed to prevent extrusion of the seal material even in low temperature situations. Inner and outer grooves are provided. O-ring seals, used for the ID of the seal, are manufactured to have a slightly greater diameter than the groove into which they will be installed. The greater length provides stored energy to promote sealing functionality in cold temperature situations. The O-rings used for the OD of the seal are manufactured to have a slightly smaller diameter than the groove into which they will be installed. The shorter length provides stored energy to promote sealing functionality in cold temperature situations.

19 Claims, 1 Drawing Sheet

U.S. PATENT DOCUMENTS

| | | | |
|---|---|---|---|
| 6,007,105 A * | 12/1999 | Dietle et al. | 285/94 |
| 6,224,063 B1 | 5/2001 | Faass | |
| 6,224,065 B1 * | 5/2001 | Smith | 277/611 |
| 6,705,615 B2 | 3/2004 | Milberger et al. | |
| 2003/0209857 A1 * | 11/2003 | Keene | 277/336 |
| 2004/0017047 A1 * | 1/2004 | Taylor et al. | 277/434 |

FOREIGN PATENT DOCUMENTS

| | | |
|---|---|---|
| GB | 2 353 336 | 2/2001 |
| WO | WO 03/095873 A3 | 11/2003 |

* cited by examiner

ANNULAR SEAL

FIELD OF THE INVENTION

The field of this invention is sealing annular spaces in wellhead or downhole applications and, more particularly, where low temperature exposure to the seal assembly is anticipated.

BACKGROUND OF THE INVENTION

Seals for annular spaces in downhole applications have to respond to a variety of changing conditions. During production, the produced fluids can raise operating temperatures to 350° F. or more. On the other hand, particularly in frigid climates and during shut in periods of no production, the surrounding temperature around a wellbore seal can plunge to 35° F. or even less. Traditional annular non-metallic seal designs employ anti-extrusion barriers on the top and the bottom. These devices or rings often follow the generally rectangular shape of the seal, when viewed in section. The backup rings have a generally U-shape and feature slight interference on the inside diameter and more significant interference on the outside diameter, as installed. An example of the generally U-shaped design for the anti-extrusion ring in an annular seal can be seen in U.S. Pat. No. 4,496,162. In a variation of this design, additional seal material has been added to the inside dimension of the seal assembly to make a portion of the seal protrude beyond the backup rings on the inside diameter dimension. Even though an increase in the inside diameter interference reduced failures at low temperatures, the prior design proved unreliable in exposure to even colder temperatures as experienced in shut in conditions in the harshest cold climates. Additionally, the increase in inside diameter interference made the seal significantly more difficult to install. Compression packer seals are generally illustrated in U.S. Pat. Nos. 1,350,553; 3,229,767; 3,554,280 and 4,326,588.

In the present invention, installation interference that activates the seal is generated by the relaxed OD of the seal being larger than the OD of the annular gap the seal is being installed in and the relaxed ID of the seal being smaller than the ID of the annular gap the seal is being installed in. The seal does not rely of any external axial load to function. The seal is assisted by pressure during normal functionality.

Accordingly, the present invention presents improvements to seal design to handle the colder environments. In one feature, the backup ring design has been revised to allow it to act as a spring to promote its ability to act as an extrusion barrier. In another development, resilient ring seals have been placed in the seal body and dimensionally configured to be installed in their respective grooves with a residual stored force to promote the operation of the seal assembly in reduced temperature environments. These and other features of the present invention will be more apparent to those skilled in the art from a review of the description of the preferred embodiment and the claims, which appear below.

SUMMARY OF THE INVENTION

A seal assembly capable of low temperature service is disclosed. It features upper and lower metallic backup rings that are specially shaped to act as a spring to keep the sidewalls of such rings in contact with the inside and outside surfaces to be sealed to prevent extrusion of the seal material even in low temperature situations. Inner and outer grooves are provided. O-ring seals, used for the ID of the seal, are manufactured to have a slightly greater diameter than the groove into which they will be installed. The greater length provides stored energy to promote sealing functionality in cold temperature situations. The O-rings used for the OD of the seal are manufactured to have a slightly smaller diameter than the groove into which they will be installed. The shorter length provides stored energy to promote sealing functionality in cold temperature situations.

DETAILED DESCRIPTION OF THE PREFERRED EMBODIMENT

Figure 1:
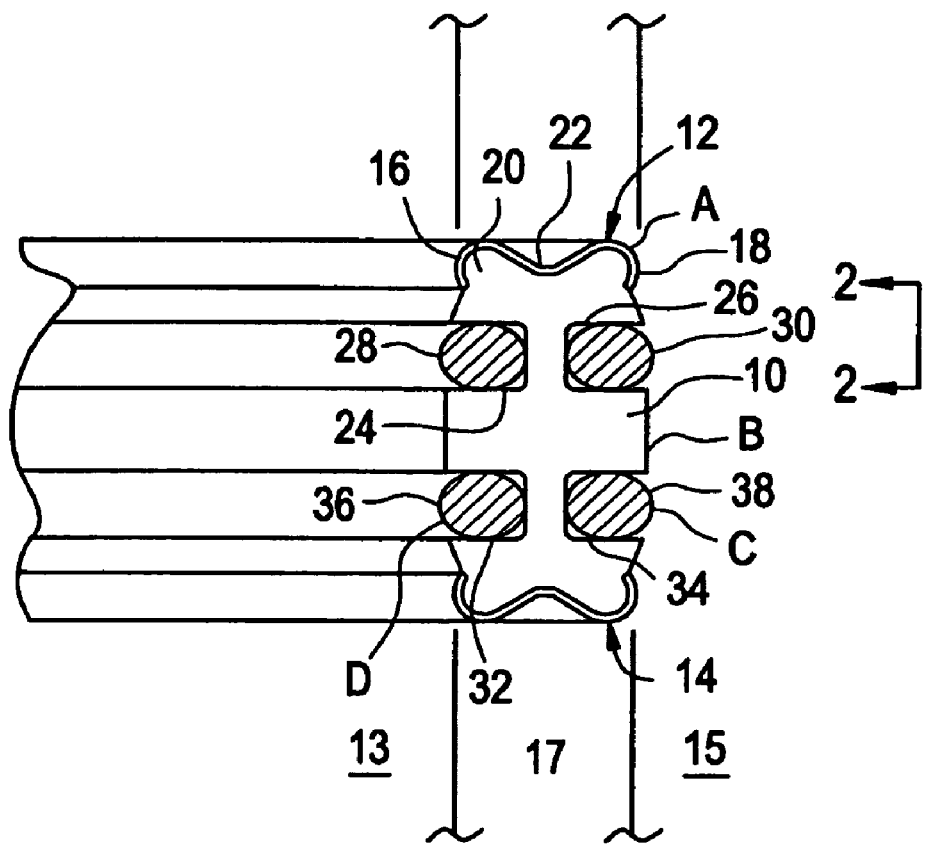
FIG. 1 is a sectional view of the preferred embodiment of the present invention.

The seal of the present invention is shown in FIG. 1. The seal has a body 10 and an upper backup ring 12 and a lower backup ring 14. The ring 12 may be formed of metal or plastic. The preferred embodiment is metal. The details of ring 12 will be described with the understanding that the preferred embodiment uses an identical ring 14. The invention does not require identical rings 12 and 14 and is functional with only one of such rings. Ring 12 features inwardly looping ends 16 and 18 that can be snapped onto the body 10 in a gripping engagement under a residual force. In essence, the upper end 20 of the seal body 10 is subjected to a compressive force by the ends 16 and 18. At the same time, the ends 16 and 18 are forced into an interference fit in the annular gap in which the seal is disposed. The ring 12 has a bend 22 that absorbs and stores a force as ends 16 and 18 are pushed into the interference fit of the annular space in which they are mounted. As a result, ring 12 acts as a spring due to the placement of bend 22. This spring effect pushes the ends 16 and 18 away from each other and into contact with the opposing walls that define the annular space that the seal assembly is intended to close. Installation of the ring 12 into the annular space causes it to elastically deform while transferring potential energy into bend 22. By design, the bulk of the bending by installation of the seal assembly occurs at bend 22. The ring 12 may be shaped to allow pressure to enhance or diminish the energy stored in the bend. The shape of the ring 12 may also be used to control the amount of force, generated by pressure, that is passed through to the body 20.

The body 10 can be made of a plastic or an elastomeric material having a Durometer hardness of preferably about 85 to 90 and optionally with reinforcement of preferably glass or carbon fibers. Alternatively, reinforced PTFE can be used. The body 10 comprises grooves 24 and 26 that respectively hold ring seals 28 and 30. Additionally, grooves 32 and 34 respectively retain ring seals 36 and 38. Body 10 adds support to rings 12 and 14 and acts to force the rings out to prevent extrusion. The grooves can be square cut, dovetailed or round bottomed. The latter form is preferred due to its ability to provide a more nearly volume filled arrangement.

Rings 30 and 38 are the main sealing members. Optionally, only one ring can be used on the outside diameter or more than two rings. The preferred material is about a 65 to 85 Durometer Arctic Nitrile to enhance low temperature performance. In the preferred embodiment, there is radial interference on rings 30 and 38 when installed in the annular gap to be sealed. Interference in the range of about 20-25% of the diameter of the ring 30 or 38 is preferred, with a minimum interference of at least about 0.015 inches. This configuration minimizes diametral stretch. Additionally, rings 30 and 38 are preferably shorter in circumference than their respective grooves 26 and 34 by about 6-20% to better retain them in the grooves for insertion into the annular space and during operation, particularly in lower temperature conditions.

With regard to inside diameter rings 28 and 36, it is preferred that they be sized so that they are circumferentially compressed when installed into their respective grooves 24 and 32. A circumferential compression in the range of about 8-15% of the relaxed circumference is preferred. This is achieved by making the circumference of rings 28 and 36 about 8-15% longer than the groove into which it is to be mounted. The larger the oversize, with the rings still in their respective grooves, the greater is the force against backup rings 12 and 14 and, in turn, the greater is the stored force in rings 12 and 14 to force the ends, such as 16 and 18 against the inner and outer surfaces that define the annular gap that the seal assembly is meant to close. The preferred material is about a 65 to 85 Durometer Arctic Nitrile to enhance low temperature performance. When rings 28 and 36 are installed and in contact with the inside diameter the circumferential compression results in an axial wave pattern occurring in the respective groove as well as some pushing of grooves 24 and 32 toward grooves 26 and 34 respectively. This wave deformation in the axial direction along the circumference puts an additional axial force against rings 12 and 14 to cause their respective ends, such as 16 and 18 to splay apart for better contact with the walls that define the inner and outer surfaces to be sealed by the seal assembly.

Figure 2:
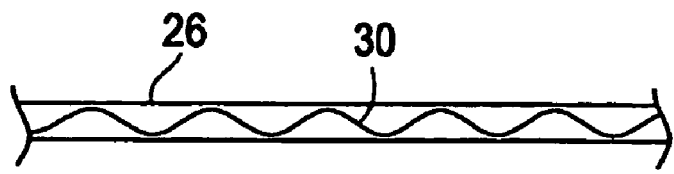
FIG. 2 is a view of a ring such as 30 along lines 2-2 of FIG. 1 showing the undulating wave pattern.

While the seal assembly has been illustrated for use in a static condition, the design is workable in a dynamic situation. Those skilled in the art will appreciate that the seal assembly can be mounted for support in a groove in the inner 13 or outer body 15 forming the annular gap 17 that the seal assembly is designed to close. The backup rings 12 and 18 can be optionally used without the seal rings 28, 30, 36, and 38. FIG. 2 shows the undulating profile viewed in the axial direction after assembly of one of said rings to an associated groove. Alternatively any number of seal rings can be used on the inside or the outside diameter. Alternatively, one or more seal rings in groove can be used only on the inside or the outside diameter, within the scope of the invention.

The foregoing disclosure and description of the invention are illustrative and explanatory thereof, and various changes in the size, shape and materials, as well as in the details of the illustrated construction, may be made without departing from the spirit of the invention.

We claim:

1. A seal assembly for closing off an annular space between a first and second body and supported by at least one of said first and second bodies, comprising:
   an annularly shaped body having an upper and a lower end and a longitudinal axis; and
   at least one backup ring mounted on one of said ends of said body and having a relaxed dimension greater than the annular space between said first and second bodies so that opposed ends on said backup ring must be compressed to be inserted in the annular space, said backup ring further comprising a bend between said opposed ends to store a force created by insertion of said backup ring into the annular space and apply said force on said opposed ends against said first and second bodies;
   said body comprises at least one first ring in a first groove, said first groove having a bottom and a first circumference at said bottom;
   the circumference of said first ring at a location nearest said first circumference of said first groove differs before mounting from said first circumference of said first groove so as to apply a net radial force to said body in a direction substantially perpendicular to said longitudinal axis.

2. The assembly of claim 1, wherein:
   said first ring, when placed in contact with one of said first and second bodies, deforms said first groove to force said ends of said backup ring away from each other.

3. The assembly of claim 1, wherein:
   said first ring circumference is in the range of at least about 8-15% different from said groove in which it is installed.

4. The assembly of claim 1, wherein:
   said first ring is made from a material having a Durometer hardness of about 56-85.

5. The assembly of claim 1, wherein:
   said first ring contacts the one of said first and second bodies with the larger dimension;
   said first ring, when said body is installed in the annular space, is in an interference fit with said one of said first and second bodies to an extent of at least about 20% of the cross-sectional diameter of said first ring.

6. The assembly of claim 5, wherein:
   said first ring is made from a material having a Durometer hardness of about 56-85.

7. The assembly of claim 1, wherein:
   said body further comprises at least one second ring in a second groove disposed on the opposite side of said body from said first ring;
   said second ring contacts the one of said first and second bodies with the larger dimension;
   said second ring, when said body is installed in the annular space, is in an interference fit with said one of said first and second bodies to an extent of at least about 20% of the cross-sectional diameter of said second ring.

8. The assembly of claim 7, wherein:
   said first ring is made from a material having a Durometer hardness of about 56-85.

9. The assembly of claim 2, wherein:
   said body has a longitudinal axis and said deformation results in said first ring deforming into an undulating wave pattern in an axial direction parallel to said longitudinal axis.

10. A seal assembly for closing off an annular space between a first and second body and supported by at least one of said first and second bodies, comprising:
    an annularly shaped body having an upper and a lower end and a longitudinal axis;
    said body comprises at least one first ring in a first groove, said first groove having a bottom and a first circumference at said bottom;
    the circumference of said first ring at a location nearest said first circumference of said first groove differs before mounting from said first circumference of said first groove so as to apply a net radial force to said body in a direction substantially perpendicular to said longitudinal axis.

11. The assembly of claim 10, wherein:
    said first ring circumference is in the range of at least about 8-15% different from said groove in which it is installed.

12. The assembly of claim 11, wherein:
    said body further comprises at least one second ring in a second groove disposed on the opposite side of said body from said first ring;
    said second ring, when said body is installed in the annular gap, is in an interference fit with said one of said first and second bodies to an extent of at least about 20% of the cross-sectional diameter of said second ring.

13. The assembly of claim 12, wherein:
said first and second rings are made from a material having a Durometer hardness of about 56-85.

14. The assembly of claim 13, further comprising:
at least one backup ring mounted on one of said ends of said body and having a relaxed dimension greater than the annular gap between said first and second bodies so that opposed ends on said backup ring must be compressed to be inserted in the annular gap, said backup ring further comprising a bend between said opposed ends to store a force created by insertion of said backup ring into the annular space and apply said force on said opposed ends against said first and second bodies.

15. The assembly of claim 14, wherein:
said first ring, when placed in contact with one of said first and second bodies, deforms in a manner so as to force said ends of said backup ring away from each other.

16. The assembly of claim 15, wherein:
said first ring contacts the one of said first and second bodies with the smaller dimension;
said body has a longitudinal axis and said deformation results in said first ring deforming into an undulating wave pattern in an axial direction parallel to said longitudinal axis.

17. The assembly of claim 1, wherein:
said first ring is softer than said body.

18. The assembly of claim 10, wherein:
said first ring is softer than said body.

19. A seal assembly for sealing an annular space between first and second bodies, comprising:
an annularly shaped body having first and second ends, and at least one notched portion disposed between the first and second ends;
at least one backup ring disposed on one of the first or second ends, the backup ring comprising:
a pair of loop ends extending toward the annularly shaped body and configured to secure the backup ring to the annularly shaped body;
an inflected portion located between the loop ends and in abutment with the annularly shaped body, wherein the inflected portion facilitates elastic deformation of the backup ring; and
a sealing ring disposed in the notched portion of the annular body and configured to provide a biasing force in a radially inward direction with respect to the annular body.

\* \* \* \* \*